United States Patent [19]

Lemaire

[11] 4,005,061

[45] Jan. 25, 1977

[54] METHOD FOR RECOVERING POTASSIUM HYDROXIDE AND ZINC OXIDE FROM POTASSIUM ZINCATE SOLUTIONS

[75] Inventor: Gilbert Lemaire, Douai, France

[73] Assignees: Saft-Societe des Accumulateurs Fixes et de Traction, Romainville, France; Compagnie Royale Asturienne des Mines, Brussels, Belgium

[22] Filed: Feb. 23, 1976

[21] Appl. No.: 660,724

Related U.S. Application Data

[63] Continuation of Ser. No. 477,826, June 10, 1974, abandoned.

[30] Foreign Application Priority Data

June 26, 1973 France .............. 73.23374

[52] U.S. Cl. .................. 423/102; 423/183; 429/206; 423/186

[51] Int. Cl.$^2$ ............ C01G 9/02; C01D 1/32

[58] Field of Search ......... 423/101, 102, 104, 186, 423/183; 23/302; 203/19; 136/86 A, 164, 165, 429

[56] References Cited

UNITED STATES PATENTS

| 1,719,056 | 7/1929 | Horsch | 423/104 |
|---|---|---|---|
| 1,783,086 | 11/1930 | Haner | 203/19 |
| 2,446,868 | 8/1948 | Cunningham | 423/183 |
| 3,424,562 | 1/1969 | Gaska | 23/200 |

FOREIGN PATENTS OR APPLICATIONS 3,670  9/1880  United Kingdom .............. 423/622

OTHER PUBLICATIONS

Mellor, Inorganic and Theoretical Chemistry, Longmans Green & Co., vol. II (1922) pp. 757, 758, vol. IV (1929) pp. 528, 529.

Primary Examiner—Oscar R. Vertiz
Assistant Examiner—Brian E. Hearn
Attorney, Agent, or Firm—Kenyon & Kenyon Reilly Carr & Chapin

[57] ABSTRACT

Method for recovering potassium hydroxide and zinc oxide from potassium zincate solutions, characterized in that a selective solvent of potassium hydroxide, which is miscible with water, is added to the zincate solution, in that the zinc oxide precipitate thus obtained is filtered and in that the mother liquors for separating the potassium hydroxide solution from the solvent are treated. The invention applies to all electrochemical storage cell batteries having a zinc negative electrode in which it is required to purify the electrolyte with a view to scavenging it.

5 Claims, No Drawings

METHOD FOR RECOVERING POTASSIUM HYDROXIDE AND ZINC OXIDE FROM POTASSIUM ZINCATE SOLUTIONS

This is a continuation of application Ser. No. 477,826 filed June 10, 1974, now abandoned.

The present invention concerns a method for recovering potassium hydroxide and zinc oxide from zincate solutions. It applies more particularly to the recovery of waste electrolytes from electric cells having a zinc negative electrode.

Within the scope of the campaign against pollution, it has been proposed to replace petrol propulsion of cars by electric propulsion. The main obstacle to that substitution is constituted by the heavy battery which is recharged slowly. Recently air depolarization cells, having a zinc negative electrode, were proposed for that battery, the zinc possibly being in the form of a suspension of powder in the electrolyte flowing through the cells. The recharge of the battery is then effected by draining the waste electrolyte formed of a solution of potassium zincate and by replacing that electrolyte by new electrolyte consisting of a suspension of zinc in potassium hydroxide. The question then arises of recovering the zinc and of the electrolyte from the potassium zincate solutions constituted by the waste electrolyte.

The electrolysis of these solutions to recover zinc has generally been proposed. But whatever the recovering method used, it is certain that it cannot be carried out in service stations which effect the recharge of the batteries. The operations are too complicated and require a supervision which can be expected only from specialists. These solutions must therefore be dealt with in treating plants and their transport then constitutes a very expensive factor of the cost of transformation.

The present invention is intended to overcome that disadvantage and its aim is to implement a simple and inexpensive method for scavenging the electrolyte which may be applied in service stations and which makes it possible, simultaneously, to obtain solid zinc oxide which is easily transportable.

The object of the present invention is a method for recovering potassium hydroxide and zinc oxide from solutions of potassium zincate characterized in that a selective solvent of potassium hydroxide which is miscible with water, is added to the zincate solution, in that the zinc oxide precipitate thus obtained is filtered and in that the mother liquors are treated to separate the potassium hydroxide solution from the solvent.

According to one embodiment of the invention, the said selective solvent is constituted by ethanol or preferably methanol.

According to a preferred embodiment, the separation of the potassium hydroxide solution from the solvent is effected by fractional distillation.

The ratio of methanol volume in relation to the potassium zincate solution is, to great advantage, comprised between 1 and 5 and is preferably equal to 3.

Other characteristics and advantages of the invention will become apparent on examining the examples given hereinbelow by way of illustration and having no limiting character.

An electrolyte used in an electrochemical cell of the zinc-air type consisting essentially of a suspension of zinc in potassium hydroxide has been examined. During the discharge of the cell, the zinc in suspension is oxidized in contact with the support of the negative electrode and potassium carbonate is, moreover, formed subsequent to the absorption of carbon dioxide by the potassium hydroxide.

Table I gives an example of the composition of a liter of such a waste electrolyte:

TABLE I

| | |
|---|---|
| K | 496 g |
| $Z_n$ | 330 g |
| $CO_3^2$ | 2.06 g |

The solution may comprise, moreover, impurities such as lead, silica, vanadium oxide, etc.

1 to 5 parts by volume of methanol are added to one part by volume of that solution, shaking vigorously. On the one hand, a liquid substance consisting of a solution of potassium hydroxide in methanol and on the other hand, a solid substance comprising a precipitate of zinc oxide, potassium carbonate, silica, a residue of zinc and a few impurities, are obtained.

The potassium hydroxide is separated from the methanol by distillation, the methanol being able to be immediately used for regenerating another amount of waste electrolyte.

Zinc oxide is treated to extract zinc therefrom, for example by heat treatment with carbon, or by indirect heat treatment, or by electrolysis.

Table II shows, herebelow, the quantity of potassium hydroxide extracted in moles per litre and the maximum quantity of the zinc residue in grams per liter remaining in the solution for various quantities of methanol added to a volume of solution to be treated.

TABLE II

| Volumes of methanol | Potassium hydroxyde Moles per liter | Zinc grams per liter |
|---|---|---|
| 2 | 10.40 | 58.9 |
| 3 | 10.70 | 13.1 |
| 4 | 10.30 | 7.2 |
| 5 | 9.85 | 4.0 |

Table III shows the outcome of the regeneration treatment of the original solution after the rinsing of the precipitate:

TABLE III

| | |
|---|---|
| Yield of potassium hydroxyde | 92% |
| Loss of zinc | 1% |

It will be observed that the losses of potassium hydroxide and of zinc are very slight.

The method according to the invention therefore makes it possible to regenerate simply, effectively and economically an electrolyte consisting of a suspension of zinc in potassium hydroxide. It should be observed that if the regeneration reaction is not complete, the presence of a remainder of zincate in the electrolyte is not really inconvenient.

Moreover, the method has the great advantage of providing a decarbonated solution of potassium hydroxide without requiring any difficult and expensive extra treatment.

It may be worked in automatic apparatuses arranged in service stations effecting the recharging of generators.

It must be understood that the invention is not limited to the example given hereinabove; more particularly, any selective solution of potassium hydroxide, may be used, ethanol, for example, or any suitable mixture, of solvents all miscible with water.

The invention applies to all electrochemical cells having a zinc negative electrode whose electrolyte is to be purified with a view to recovering it.

What is claimed is:

1. Method of recovering decarbonated potassium hydroxide electrolyte for re-use in electrochemical cells and also zinc oxide from a waste potassium zincate solution extracted from a discharged electrochemical cell comprising the steps of agitating such extracted solution while adding 1 to 5 parts by volume of a solvent selected from the group consisting of methanol, ethanol, and mixtures thereof to said waste zincate solution to effect precipitation of said zinc oxide together with potassium carbonate therefrom, removing the precipitate and leaving a residual mother liquor comprising potassium hydroxide and said solvent and thereafter distilling said mother liquor to effect separation of decarbonated potassium hydroxide electrolyte from said mother liquid for direct re-use as electrolyte in electrochemical cells and recovering the distilled solvent for re-use with other waste potassium zincate solutions.

2. Method according to claim 1 wherein said solvent is methanol and the ratio of methanol volume to the volume of potassium zincate solution is comprised between 1 and 5.

3. Method according to claim 2 wherein said ratio of methanol volume to said volume of potassium zincate solution is equal to about 3.

4. Method according to claim 1 including the step of fractional distillation of said mother liquid to effect separation of potassium hydroxide from said solvent.

5. The method according to claim 1 wherein said distillation is fractional.

* * * * *